United States Patent [19]

Deval

[11] 4,345,474
[45] Aug. 24, 1982

[54] ELECTROSTATIC ACCELEROMETER

[75] Inventor: Alain Deval, Plaisir, France

[73] Assignee: Societe d'Applications Generales d'Electricite et de Mecanique SAGEM, Paris, France

[21] Appl. No.: 138,731

[22] Filed: Apr. 9, 1980

[30] Foreign Application Priority Data

Apr. 11, 1979 [FR] France .................... 79 09213

[51] Int. Cl.³ .............................................. G01P 15/13
[52] U.S. Cl. ................................................. 73/517 B
[58] Field of Search ...................... 73/516 R, 517 B; 318/636, 648, 651, 662, 676

[56] References Cited

U.S. PATENT DOCUMENTS

| 3,209,601 | 10/1965 | Stiles | 73/517 B |
|---|---|---|---|
| 3,229,530 | 1/1966 | Wilcox | 73/517 B |
| 3,673,873 | 7/1972 | Estes et al. | 73/517 B |
| 3,877,313 | 4/1975 | Ferriss | 73/517 B |
| 3,911,738 | 10/1975 | Fischer | 73/517 B |
| 4,009,607 | 3/1977 | Ficken | 73/517 B |
| 4,023,413 | 5/1977 | Stauber | 73/517 B |
| 4,102,202 | 7/1978 | Ferriss | 73/517 B |

FOREIGN PATENT DOCUMENTS 736006 8/1955 United Kingdom .

Primary Examiner—James J. Gill
Attorney, Agent, or Firm—Synnestvedt & Lechner

[57] ABSTRACT

A pendulous accelerometer comprises a stator defining a cavity having two confronting surfaces which constitute two electrodes.

It also comprises a pendulum consisting of a disc connected to the stator by a hinge. A servo-circuit applies DC forces to the capacitors, each comprising a surface of the cavity and the confronting electrically conductor surface of the pendulum for creating an electrostatic torque which balances the acceleration torque.

3 Claims, 9 Drawing Figures

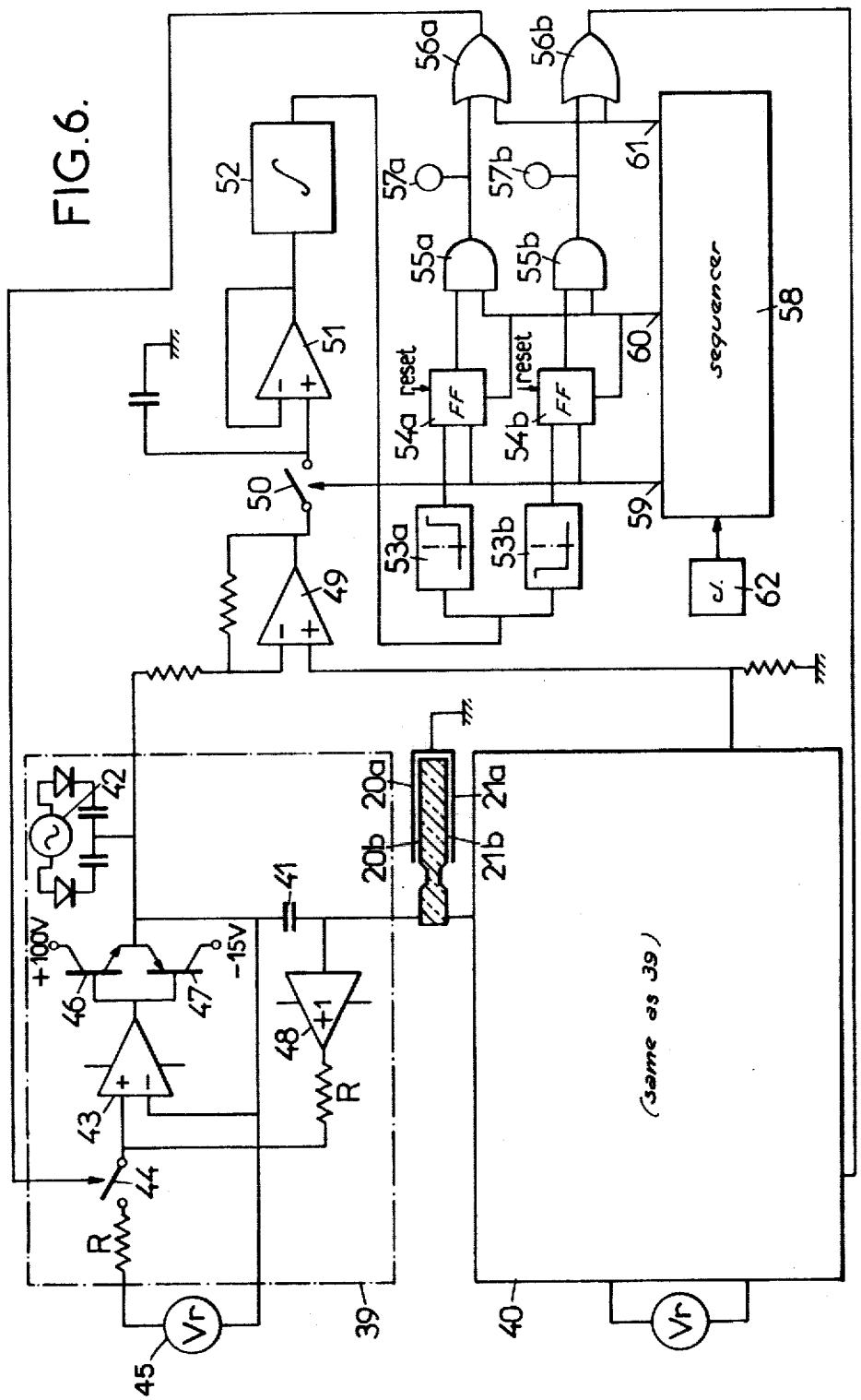

4,345,474

ELECTROSTATIC ACCELEROMETER

BACKGROUND AND SUMMARY OF THE INVENTION

The present invention relates to pendulous accelerometers, in which the sensitive member, formed by a pendulum, is rebalanced, i.e. restored to a predetermined neutral or rest position whatever the acceleration which is exerted thereon within its operating range.

It relates more particularly to accelerometers of the type comprising a stator housing adapted to be secured to the object whose acceleration it is desired to measure, defining a cavity having two opposite faces perpendicular to a sensitive axis of the accelerometer and forming two electrodes, and comprising a pendulum formed by a disc of insulating material with parallel electrically conducting faces, confronting said faces of the stator, which disc is connected to the stator by a hinge allowing it to oscillate under the action of the accelerations directed parallel to the sensitive axis, and a detection circuit for measuring the imbalance of the capacities of the two capacitors each formed by one face of the cavity and the conducting face opposite the pendulum.

It is an object of the present invention to provide an accelerometer of the above-defined type which is simple in construction, low in cost and capable of operating for long periods of time without appreciable overheating.

According to the invention, there is provided an electrostatic pendulous accelerometer for measuring acceleration along a sensing axis, comprising: a stator defining an internal cavity; a pendulum consisting of an electrically insulating disc connected to the stator by hinge means allowing the pendulum to oscillate under the action of accelerations along said sensing axis; a pair of first electrodes formed on the opposite surfaces of said cavity perpendicular to said sensing axis; second electrodes disposed on the opposite sides of said disc, each confronting one of said first electrodes and in capacitive relation therewith; a detection circuit for detecting unbalance between the capacities of two capacitors each comprising one of the first electrodes and the confronting second electrode; a servo control circuit responsive to said unbalance for applying on said capacitors DC voltages creating electrostatic torques balancing the acceleration torque exerted on the pendulum; and circuit means for measuring the difference between the voltages applied to said capacitors for determining the value of the acceleration along the sensing axis.

The invention will be better understood from the following description of accelerometers which form particular embodiments thereof, given by way of examples. The description refers to the accompanying drawings.

SHORT DESCRIPTION OF THE DRAWINGS

FIG. 6 is a block diagram of a digital circuit based on the arrangement of FIG. 5;

SHORT DESCRIPTION OF PARTICULAR EMBODIMENTS

Figure 1:
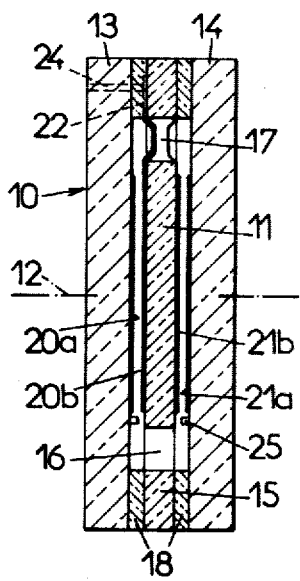
FIG. 1 is a simplified diagram of the mechanical parts of the accelerometer, in section along a plane passing through the sensitive axis (the scale not being respected for more clarity).
Figure 2:
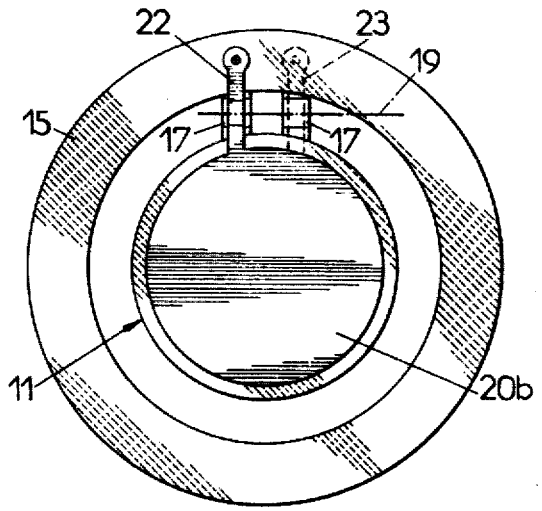
FIG. 2 is a diagram showing the construction of the pendulum of the accelerometer.

The accelerometer may be regarded as comprising mechanical and electromagnetic parts, shown schematically in FIGS. 1 and 2, and an electronic circuit.

The mechanical and electromagnetic parts comprise a stator 10 containing a pendulum 11 capable of oscillating about an axis perpendicular to the sensitive axis 12 of the accelerometer. The stator comprises two side members 13, 14, made from a material having a thermal expansion coefficient close to that of the pendulum, formed as circular plates. Silica and Fe-Ni alloys may in particular be used. Side members 13 and 14 and an inner part 15 clamped between them, define a chamber 16. The inner part 15 is formed by an external ring from which pendulum 11 is suspended by two hinges 17. Part 15 is advantageously formed as a silica disc obtained by melting, cooling and machining. Such machining may be effected by ultrasonic means. For convenience, manufacture will generally start from a disc of constant thickness, which will dictate placing insulating spacers 18 between the external ring of inner part 15 and members 13 and 14, so as to provide the space required for movement of the pendulum 11.

Hinges 17 are formed by lugs thinner than the ring of the pendulum. The lugs may be formed by chemical machining, with fluorhydric acid HF for example. The hinges 17 define the axis of oscillation 19 of the pendulum.

It is necessary to form capacitor electrodes on the confronting faces of pendulum 11 and stator 10 (if the latter is insulating). All electrodes may be formed as a thin metal layer. The layer may be obtained by evaporation and deposition under vacuum for example. Referring to FIG. 1, a first capacitor comprises the circular electrodes 20a and 20b supported respectively by side member 13 and the opposite face of pendulum 11. A second capacitor is formed by electrodes 21a and 21b, respectively supported by side member 14 and the opposite face of pendulum 11.

The electrical connections between the electrodes and the outside circuitry may project through one of the side members (member 13 in the embodiment illustrated). Electrodes 20a and 21a are extended by lugs and are electrically connected to one another and to the outside by a metal coating of the walls of a hole formed through member 13, spacers 18 and the external ring of part 15. Each of the electrodes 20b and 21b is extended by a metal tongue 22 or 23 deposited on a corresponding hinge 17. A metal coated hole (24 for electrode 20b) ensures the connection with the outside.

It will be appreciated that the mechanical and electrical parts of the accelerometer are in the form of a closed assembly small in thickness because of the absence of an electromagnetic motor. To prevent the electrodes from coming into contact, studs such as 25 may be disposed between pendulum 11 and the side members. However the studs may be dispensed with by stopping the metal coating of the surfaces at a few millimeters from the edge: thus, abutment takes place outside the electrode.

The casing may be constructed in different ways. It may be arranged for providing electromagnetic shielding and forming a sealed enclosure. The side members may be fixed to one another by three screws disposed at 120°. The spacers may be replaced by small pellets through which the screws project. Because of the very small thickness required to the spacers (10 microns for example), they may be formed by a coating.

Instead of securing screws, a collar may be used, all the more so since accurate angular positioning is not required because the parts are substantially of revolution.

The electronic part comprises a system for detecting deviation of pendulum 11 and a measuring and pendulum recentering system, forming a servo-control loop with the detection system. The detection system may be the same with an analog recentering system (FIG. 3) or with a digital return system (FIG. 4). In both cases the circuits will typically be hybrid microelectronics and located on one or more discs having the same diameter as the side members, mounted on one of the members to reduce as much as possible electrostatic phenomena.

Figure 3:
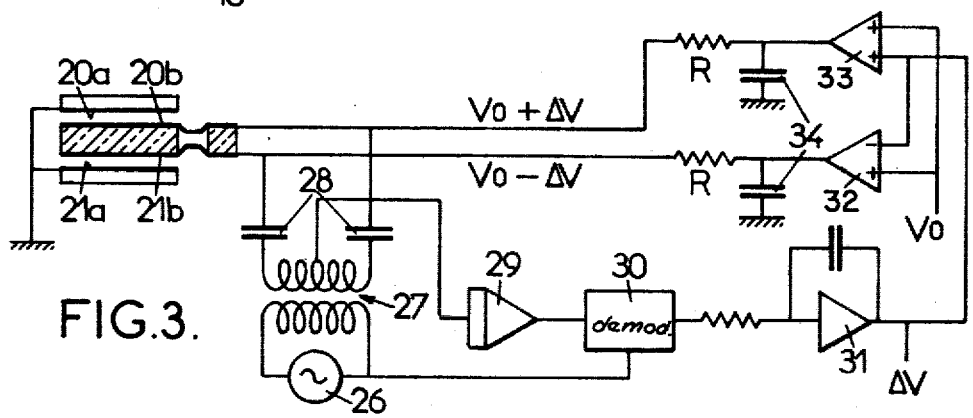
FIGS. 3 and 4 are simplified diagrams respectively of an analog circuit (FIG. 3) and a digital circuit (FIG. 4) suitable for use in association with the mechanical part shown in FIGS. 1 and 2.
Figure 4:
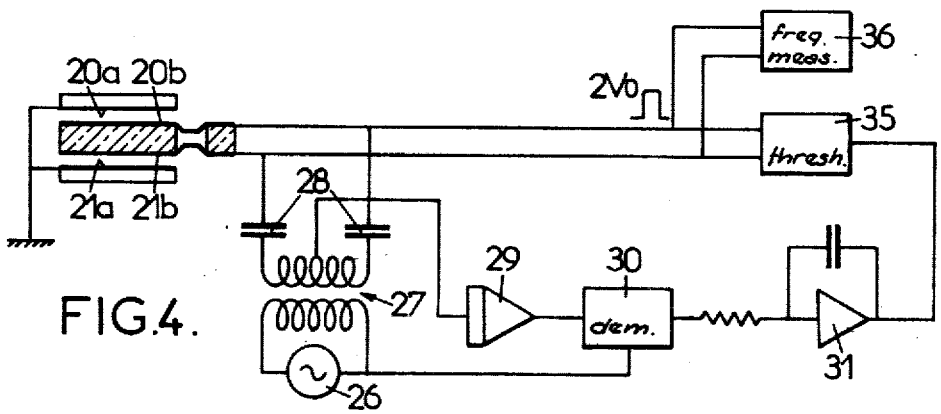

The capacitive detection system of the embodiments shown in FIGS. 3 and 4 comprises a high-frequency generator whose frequency is selected depending on the desired passband for the accelerometer. The generator 26 will for example supply a frequency of 20 KHz when the frequency band of the accelerations to be detected does not exceed 100 to 150 Hz. The A.C. signal supplied by generator 26 is applied, through a midpoint transformer 27 and decoupling capacitors 28, to electrodes 20b and 21b. Electrodes 20a and 21a are connected to earth.

The A.C. unbalance signal which appears at the midpoint of transformer 27 is applied to an amplifier 29 having a high gain in the desired passband (for example $10^3$ at 100 Hz). The signal is then applied to a synchronous (phase lock) demodulator 30. The output of demodulator 30 is applied to an integrating amplifier 31. Although not indispensable, it may be preferable to use an integrating amplifier having practically infinite DC gain so as to avoid any error on zero. The voltage output $\Delta V$ by the amplifier, representative of the acceleration, is applied to a measuring apparatus.

The recentering system, forming a servo-control loop with the detection system, comprises an electrostatic return force generator which embodies the electrodes of the capacitors also used for the detection.

The electrostatic attraction force between two electrodes at distance e is proportional to $V^2/e^2$ (V being the applied DC voltage). The force depends on the square of V. To make the recentering or balancing force to be exerted on the pendulum a substantially linear function of the applied DC voltage, the recentering system shown in FIG. 3 comprises a generator superimposing a DC voltage $V_0$, which will be called pre-stress voltage, on the unbalance voltage $\Delta V$.

The device shown in FIG. 3 comprises to this end a differential amplifier 32 and a summing amplifier 33. Amplifiers 32 and 33 receive, on respective positive inputs, the pre-stress voltage $V_0$. Voltage $\Delta V$ is applied to the negative input of amplifier 32 and the other positive input of amplifier 33. The outputs of amplifiers 32 and 33 are applied, through resistors of value R, to electrodes 20b and 21b. Capacitors 34 ensure uncoupling and prevent a residual alternating component being applied to electrodes 20b and 21b.

In this case, if S is the area of the confronting surfaces of the electrodes and $\epsilon$ is the dielectric constant of the gas in the gaps e, the electrostatic force which is exerted on the pendulum is:

$$f = \frac{\epsilon S}{2}\left[\left(\frac{V_0 + \Delta V}{e_1}\right)^2 - \left(\frac{V_0 - \Delta V}{e_2}\right)^2\right] \quad (1)$$

In formula (1), $e_1$ and $e_2$ designate the thickness of dielectric between 20a and 20b, 21a and 21b respectively.

When the pendulum is balanced in centered position by the servo-control system, $e_1 = e_2 = e_0$ (nominal gap) and:

$$f = 2\epsilon S \frac{V_0}{e_0^2} \Delta V \quad (2)$$

Since the electrostatic force is proportional to the acceleration applied to the pendulum, the measured voltage $\Delta V$ is proportional to the acceleration, the factor of proportionality being obtained by calculation. In practice, when e has a value of a few microns and the electrodes a surface of a few square centimeters, it will generally be sufficient to use a pre-stress voltage $V_0$ not exceeding 50 V, $\Delta V$ remaining also less than this value.

In the digital system shown in FIG. 4 (whose elements corresponding to those of FIG. 3 will not be described again), the output of integrator 31 is connected to a threshold circuit 35 which applies to the electrodes 20b and 21b of the pendulum square voltage pulses of value 2 $V_0$, in one direction or in the other according to the direction of the acceleration; the frequency of the square pulses, measured by means of an apparatus 36, supplies the value of the acceleration applied along the sensitive axis. A counter may be provided for counting the number of pulses 2 $V_0$ each representative of a seed increment of predetermined value.

Numerous other embodiments exist. For instance, the measuring and servo-control circuits may be provided for supplying an accurate measurement, even if the pendulum is not exactly centred.

The problem associated with an offset with respect to the centered position appears by studying formulae (1) and (2) where it is seen that the electrostatic force f depends on the air gap. However, if the force f is expressed as a function of charge Q of the capacitor, it takes on the form:

$$f = Q^2/2\epsilon S \quad (3)$$

and the value of air gap e no longer appears in the formula.

That finding is used by dealing with charges Q and no longer solely on voltages $\Delta V$; charge amplifiers are used and each of capacitors 20a-20b and 21a-21b is connected in cascade with a fixed standard capacitor which will be charged at the same voltage as the measuring capacitor and which will supply a reference.

Figure 5:
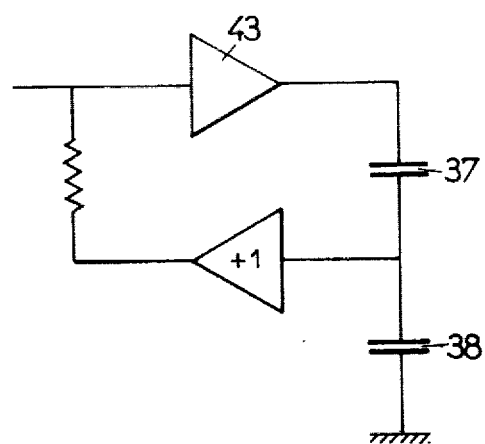
FIG. 5 is an illustration of a capacitor arrangement modified with respect to that of FIG. 4.

Referring to FIG. 5, there is shown a simplified diagram of the circuit. Capacitors 37 and 38 are formed, one by the measuring capacitor (electrodes 20a and 20b for example), the other by the reference capacitor. A choice must then be made. If the measuring capacitor is used as capacitor 37, output connections should be provided on both electrodes whereas in the preceding case one of the electrodes of each capacitor is earthed. If it is used as capacitor 38, it is necessary to provide a "floating" electric supply.

In the embodiment illustrated in FIG. 6, the second solution has been selected. For simplicity, the parts of FIG. 6 which have a counterpart in the preceding figures are designated with the same reference number.

The servo-control and measuring system of the accelerometer shown in FIG. 6 comprises two charge amplifiers 39 and 40 each associated with one of the measuring capacitors. The first amplifier will be described only.

Charge amplifier 39 is associated with the capacitor whose electrodes are 20a (earthed) and 20b. That capacitor, whose capacity will be designated by Cp+, is in series relation with a reference capacitor 41 of capacity Ce and a supply comprising a high frequency source 42 whose poles are each connected to the capacitor by a diode and a capacitor connected in cascade.

The system further comprises a differential amplifier 43. A switch 44 (which may be an analog gate) periodically connects the input of amplifier 43 to a generator 45 of reference voltage Vr through a load resistor. Amplifier 43 controls a circuit for charging and discharging the measuring and reference capacitors, formed by two transistors 46 and 47 connected, one to a positive voltage (+100 V for example) the other to a negative voltage (−15 V for example) in relation to zero.

A counter feedback loop associated with amplifier 43 comprises an operational amplifier 48 of unity gain, whose input is connected to the common point of the reference capacitor 41 and the measuring capacitor, and whose output drives, through a resistor R, the + input of the differential amplifier 43.

Before describing the digital circuit which completes the system, it may be useful to briefly indicate the operation of the charging amplifier 39 which operates in successive sequences, each sequence comprising loading the capacitors by the floating supply, then unloading.

During the charging period, switch 44 is closed. Transistor 46 supplies a current I which charges the capacitors, of capacity Cp+ and Ce, until the voltage at the terminals of capacitor 41 is equal to voltage Vr. Then it ceases because the counter-feedback loop becomes operative.

The measuring and reference capacitors thus receive the same quantity of electricity Q:

$$Q = Ce \cdot Vr$$

and the voltage Vp+ at the terminals of the capacitor formed by 20a and 20b is:

$$Vp+ = (Ce/Cp)Vr.$$

Discharge takes place when switch 44 opens. Amplifier 43 then disables transistor 46 and enables transistor 47 through which the reference and measuring capacitors are discharged. A constant current flows through transistor 47 until the voltage Ve at the terminals of the reference capacitor 41 has become zero.

During the discharge, the measuring and reference capacitors supply the same quantity of electricity Q: at the end of the discharge, Vp+ = 0.

The charge amplifier will be used, on the one hand, as a means for detecting the position of the pendulum, i.e. as input element of the servo-control circuit controlling the position of the pendulum, on the other hand, as a return force generator.

The two functions will be successively studied.

Detection of the position of the pendulum

Since amplifiers 39 and 40 are identical, the two capaitors 20a-20b and 21a-21b receive the same charge Q during the loading period. The capacities of these two capacitors will be designated by Cp+ and Cp−.

With electrodes 20a and 20b earthed, the voltages V+ and V− of electrodes 20b and 21b will be:

$$V+ = Q/Cp+; \quad V- = Q/Cp-$$

If Δe is the deviation with respect to the nominal air gap e₀:

$$Cp+ = \epsilon_0 S/e_0[1 - (\Delta e/e_0)]$$

For the other condenser:

$$Cp- = \epsilon_0 S/e_0[1 + (\Delta e/e_0)]$$

The resulting voltage Vd beteen the electrodes 20b and 21b is then:

$$Vd = \frac{Q}{Cp+} - \frac{Q}{Cp-}$$

$$= \frac{2Q}{C_0} \cdot \frac{\Delta e}{e_0}$$

in which formula C₀ designates the capacity when the pendulum is in its nominal centered position.

It will be appreciated that voltage Vd available between the electrodes provides an indication of the deviation Δe of the pendulum in relation to its nominal centred position.

Generator of force

As indicated above, the force of attraction F between the electrodes is of the form:

$$F = K (Vp/e)^2 \quad \text{with} \quad K = \epsilon S/2$$

which may also be written:

$$F = \frac{KQ^2}{\epsilon^2 S^2} = \frac{Q^2}{2\epsilon S}$$

which shows that F is a function of Q independent of distance e.

Measurement of Q will provide F and a measurement of the acceleration, which remains exact even when the pendulum is not in its nominal centred position.

The charge amplifiers 39 and 40 drive a servocontrol circuit tending to prevent the pendulum from leaving a predetermined range about its nominal position. In the embodiment shown in FIG. 6, the input component of the servo-control circuit is a differential amplifier 49. An input switch 50 of a sample and hold circuit 51, typically formed by a FET transistor receives the output of amplifier 49. The output signals of the S & H circuit are applied to a unit 52 having an integrator and a correction network which fulfils the same role as member 31 in FIGS. 3 and 4.

The output of integrator 52, positive or negative depending on the direction of deviation of the pendulum in relation to its nominal position, is applied to two comparators 53a and 53b set to correspond to the limits of the region of permitted deviation. The output of comparator 53a is connected, through a flip-flop 54a, an AND gate 55a and an OR gate 56a mounted in cascade and whose role in the time sequencing will appear further on, to means controlling the switch 44 of the charge amplifier 39. Similarly, comparator 53b is followed by a flip-flop 54b, an AND gate 55b and an OR gate 56b whose output drives the switch corresponding to switch (44) of charge amplifier 40. The output signals indicating the acceleration are taken at 57a and 57b, at the output of AND gates 55a and 55b.

Figure 7:
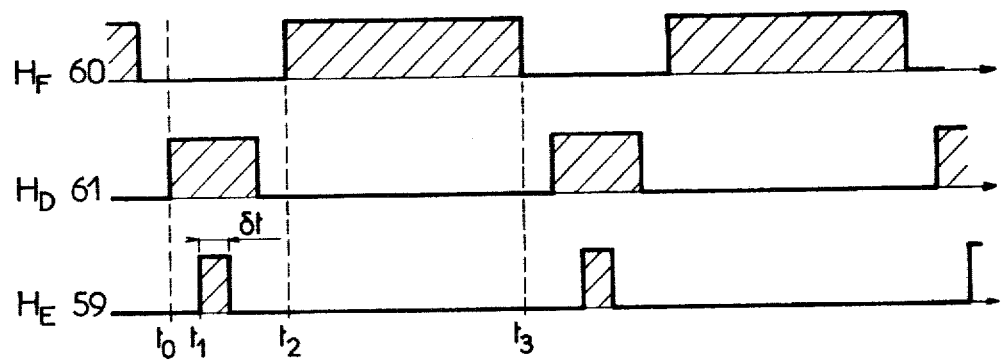
FIG. 7 is an illustration of the signals at different points of the circuit of FIG. 6.

The operation of the accelerometer is cyclic. Detection and position control take place alternately, which requires a sequencer or timing circuit 58 associated with a clock 62. The sequencer is designed to supply, at three outputs 59, 60 and 61, control square-wave pulses at binary logic levels whose time relation is shown on lines 59, 60 and 61 of FIG. 7.

From time $t_0$ there is successively a phase for detecting the position of the pendulum, then a phase of servocontrol by adjustment of the electrostatic return force.

Detection

At time $t_0$, output 61, of sequencer 58 applies a logic level 1 in the form of a pulse of predetermined length, to OR gates 56a and 56b. These gates close the switches 44 of the two charge amplifiers 39 and 40 and cause the measuring and reference capacitors to be charged with a constant current for a definite timelength.

The difference between the voltages, which appears at the output of differential amplifier 49, is sampled at time $t_1$, when the signal appearing at the output 59 of sequencer 58 closes a switch 50. That signal simultaneously resets flip-flops 54a and 54b.

The output voltage is integrated by the integrator 52 whose output voltage is compared with the two predetermined levels $S_H$ and $S_B$ (typically equal to $-S_H$) by comparators 53a and 53b.

If the pendulum is in the allowed position range, no output signal will appear at the comparators.

If on the contrary the pendulum is outside the permitted range, one of the comparators, 53a for example, will supply an output signal.

Correction

At a time $t_2$ a square pulse of logic level 1 and of a definite length $t_3-t_2$ appears at the output 60 of sequencer 58. That square pulse enables gates 55a and 55b. In the above example, a signal of logic level 1 will appear at the output of gate 55a and will be passed by OR gate 56a to the switch 44 of the charge amplifier 39 alone. This additional electrical charge will move the pendulum back towards its nominal centered position. The square pulse will also be passed to the measuring apparatus connected to the outputs 57a and 57b which may be an updown counter.

Finally, clock 59 resets flip-flops 54a and 54b.

Figure 8:
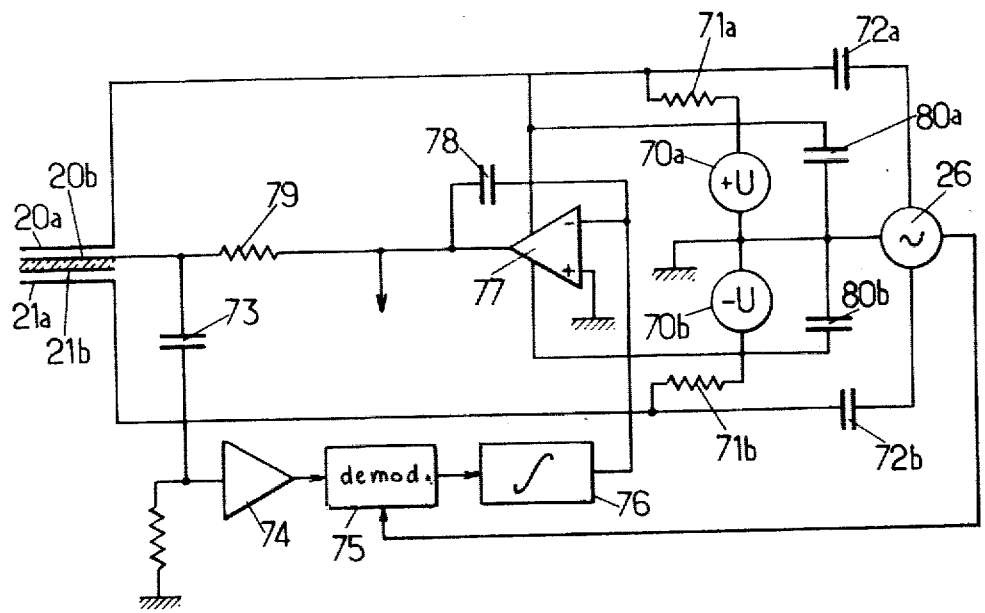
FIGS. 8 and 9 are simplified block diagrams of modifications of FIGS. 3 and 6, respectively.

Referring now to FIG. 8, there is shown a modification of the embodiment of FIG. 3. In the modified embodiment, there is a single amplifier rather than the two amplifiers with equal gains provided in FIG. 3. In addition, the modified embodiment does not require the high quality transformer 27 of FIG. 3.

The two capacitors 20a–20b and 21a–21b are biased by sources 70a and 70b which provide set voltages $+U$ and $=U$ with respect to earth, through equal resistances 71a and 71b. The dividing capacitor bridge consisting of the two capacitors, whose capacities have a common value C at equilibrium, receive two sinewave voltages out of phase by 180° with respect to earth, delivered by a generator 26 through capacitors 72a and 72b. The AC voltage which appears on electrodes 20b and 21b of the pendulum is picked up by a capacitor 73 and is applied to a detection branch comprising an amplifier 74, a phase lock demodulator 75 and a filtering and correction network 76. The filtering network is arranged to integrate signals for zero error at equilibrium. The output signal of network 76 is applied to a differential amplifier 77 having a feedback loop consisting of a capacitor 78. The DC voltage delivered by amplifier 77 is in direct relation with the value of the deviation of the pendulum with respect to its nominal centered position. The sign of the DC voltage is related to its phase with respect to the energizing voltages conveyed through capacitors 72a and 72b. Resistors 79, 71a and 71b stop the AC signals while capacitors 80a and 80b uncouple the DC voltage generators 70a and 70b.

Operation of the modified embodiment of FIG. 8 is as follows: when the pendulum is in centered position and is not subjected to acceleration, its DC voltage is equal to earth voltage, since the two capacitors defined by the pendulum have the same value and voltages $+U$ and $-U$ have the same absolute value. When an acceleration is applied to the pendulum, that acceleration results in energization of the detection and correction branch which modifies the voltage of electrodes 20b and 21b for rebalance. Computation indicates that the output voltage of amplifier 77 is proportional to the acceleration when the pendulum is in centered condition.

Figure 9:
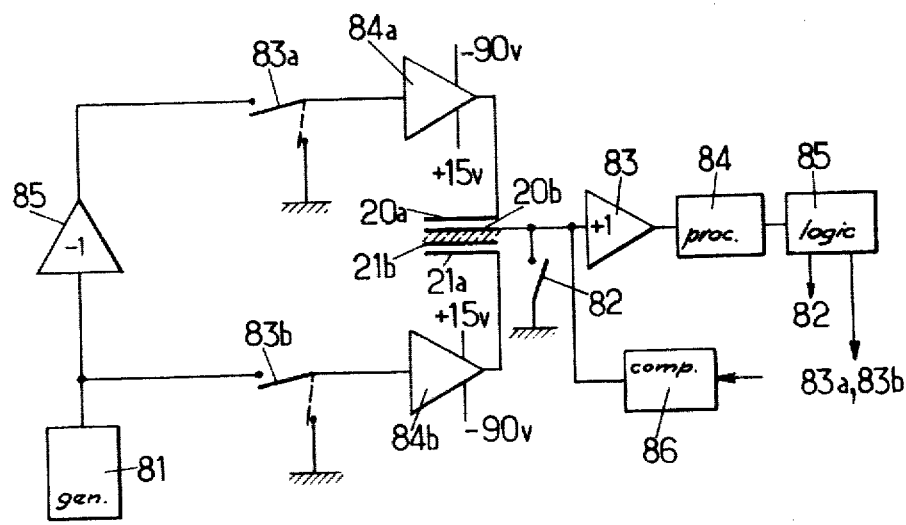

Referring to FIG. 9, there is shown a simplified sketch of a modification of the embodiment of FIG. 6. That modification provides a simple solution to a problem which occurs in the embodiment of FIG. 6. In the latter embodiment, amplifier 49 receives the capacitor bias voltage (several tens of volts) and the detection voltage (in the microvolt range) in succession. For high repetition frequencies, there may occur a temporary "blindness" of detection amplifier 49 detrimental to accuracy.

On the other hand, a single voltage value is created in the embodiment of FIG. 9, for creating the return forces and for detecting the position of the pendulum.

The electrodes 20b and 21b of the pendulum are cyclically connected to earth by a switch 82 and connected to a detection and measurement branch which comprises a cascaded arrangement of an amplifier 83 of unity gain, and a processing circuit 84. A logic circuit 85 comprises outputs for controlling switch 82 and the other switches 83a, 83b for operation in proper time succession. Switches 83a and 83b alternatively connect the inputs of amplifiers 84a and 84b, which are identical and each drives one of the electrodes 20a and 21a, to earth and to a reference voltage. The reference voltage is delivered by generator 81 which is directly connected to a fixed terminal of switch 83b and is connected by an inverter 85 to a fixed terminal of the other switch 83a. In that arrangement the midpoint of the capacitor bridge remains floating. The high impedance amplifier 83 receives an input voltage whose value and sign depend on the value and direction of the unbalance due to movement of the pendulum.

Switch 82 is closed during the periods of reset to zero or application of the balancing forces. It is open during detection. A circuit 86 reduces to zero the stray-charges injected during operation of switch 82. The detected voltage is directly used in the feedback of the position control.

The circuit illustrated in FIG. 9 can easily be implemented with components which are available in the trade. The switches may be conventional MOS switches. The high voltage amplifiers, which typically provide a voltage of 80 volts, consist of operational amplifiers having a C-MOS input stage and output bipolar transistors. The high fidelity output amplifier may include bipolar transistors.

I claim:

1. An electrostatic pendulous accelerometer for measuring acceleration along a sensing axis, comprising: a stator defining an internal cavity; a pendulum consisting of an electrically insulating disc connected to the stator by hinge means allowing the pendulum to oscillate under the action of accelerations along said sensing axis; a pair of first electrodes formed on the opposite surfaces of said cavity perpendicular to said sensing axis; a pair of second electrodes disposed on the opposite sides of said disc, each confronting one of said first electrodes and in capacitive relation therewith; a detection circuit for detecting unbalance between the capacities of two measurement capacitors each comprising one of the first electrodes and the confronting second electrode, said detection circuit comprising two legs, each leg having a reference capacitor connected to constitute a capacitor bridge with one of said measurement capacitors and a charge amplifier connected to charge said reference and measurement capacitors with a constant current; a servo-control circuit which comprises integrating amplifier means connected to receive an electric signal representative of the unbalance of the capacities of said two measurement capacitors and supplying two channels constructed and connected to cause delivery of square voltage pulses to each of the capacitive bridges by the associated charge amplifier depending on the direction of acceleration for rebalance of the pendulum, and a pulse counter connected to count the difference between the number of square pulses applied to the capacitive bridges; and a sequencer alternately supplying pulses for simultaneous energization of both charge amplifiers and pulses for selectively opening one of two gates each transmitting the outputs signals of one of said comparators to a corresponding one of said charge amplifiers, as charge controlled signals.

2. A rebalance electrostatic pendulous accelerometer for measuring acceleration along a sensing axis, comprising:
- a stator defining an electromagnetically shielded internal cavity;
- a pendulum consisting of an electrically insulating disc connected to the stator by hinge means allowing the pendulum to oscillate under the action of accelerations along said sending axis in a predetermined range about a centered position;
- a pair of first electrodes formed on the opposite surfaces of said cavity perpendicular to said sensing axis;
- a pair of second electrodes disposed on the opposite sides of said disc and electrically interconnected to be at the same potential, each confronting one of said first electrodes and in capacative relation therewith;
- a detection circuit for detecting unbalance between the capacities of two capacitors each comprising one of the first electrodes and the confronting second electrode, said detection circuit comprising an AC generator for applying AC voltages whose frequency is orders of magnitude greater than the frequency band of the accelerations to be detected, having the same amplitude and out of phase by 180° to the first electrodes and comprising capacitor means connected to said second electrodes;
- and a servo-control circuit connected to said capacitor means to receive an unbalance representative voltage therefrom, said servo-control circuit having first means for continuously applying D.C. bias voltages of equal values and opposite polarities to said first electrodes, and second means for phase lock demodulating and filtering of said unbalance voltage and delivery of a D.C. analog voltage which is in direct proportion to the filtered voltage and representative of the amount of acceleration impressed on the pendulum for rebalance thereof and which is applied to said second electrodes for rebalancing said capacitors, said first means being constructed for delivering D.C. bias voltages sufficient for linearization of the response.

3. An electrostatic pendulous accelerometer for measuring acceleration along a sensing axis, comprising: a stator defining an internal cavity; a pendulum consisting of an electrically insulating disc connected to the stator by hinge means allowing the pendulum to oscillate under the action of accelerations along said sensing axis; a pair of first electrodes formed on the opposite surfaces of said cavity perpendicular to said sensing axis; a pair of electrically connected second electrodes disposed on the opposite sides of said disc, each confronting one of said first electrodes and in capacitive relation therewith; a detection circuit for detecting unbalance between the capacities of two capacitors each comprising one of the first electrodes and the confronting second electrode, said detection circuit having a high impedance amplifier whose input is electrically connected to said second electrodes, a processing circuit for comparing the output of said amplifier with predetermined limits and delivering an output depending on the result of such comparison; a digital servo-control circuit comprising a reference voltage generator, for delivering voltages of the same values and opposed polarities for supplying respective ones of two channels each connected through first switch means and an amplifier to a respective one of said first electrode; and sequencer means connected to receive the output signal of said processing means and for alternately supplying pulses for opening additional switch means for connecting said second electrodes to earth and one or the other of the switch means of said two channels depending upon the signal received from said processing means; and a pulse counter connected to count the difference between the numbers of pulses applied to the first electrodes by the associated channels.

* * * * *